Figure 1:
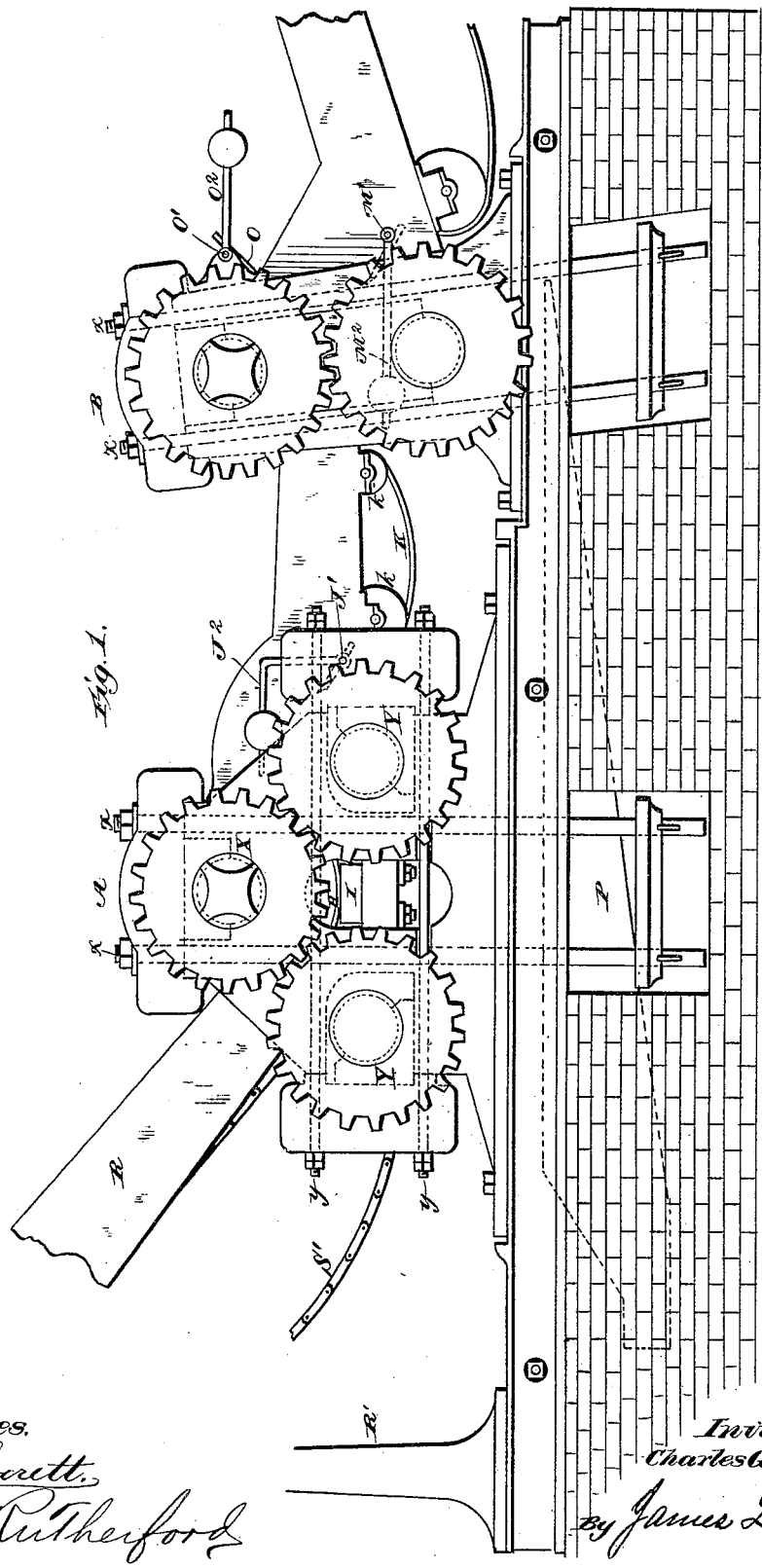

(No Model.)

5 Sheets—Sheet 1.

C. G. JOHNSEN.
SUGAR MILL.

No. 252,774.

Patented Jan. 24, 1882.

Witnesses.
Robert Everett,
J. A. Rutherford

Inventor:
Charles G. Johnsen,
By James L. Norris
Atty.

N. PETERS. Photo-Lithographer, Washington, D. C.

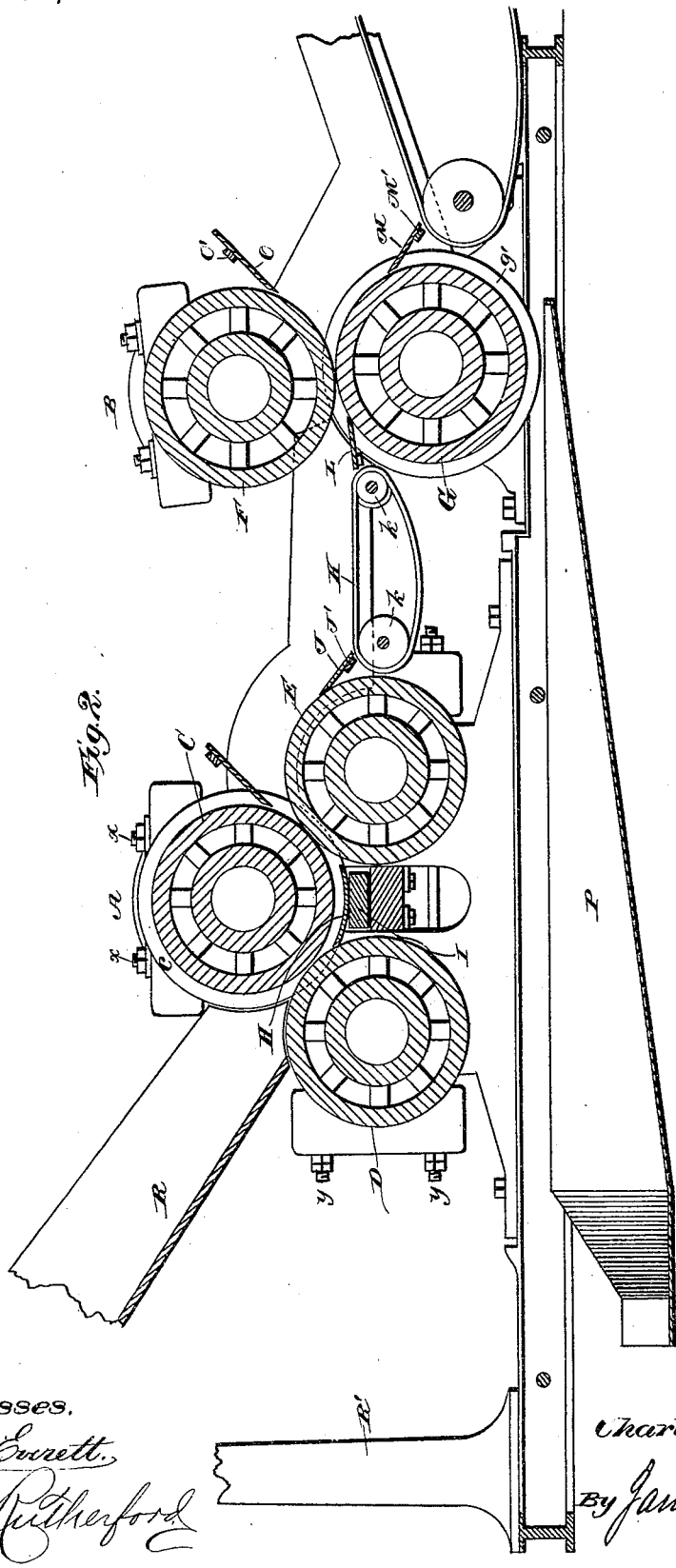

(No Model.)                     5 Sheets—Sheet 3.
C. G. JOHNSEN.
SUGAR MILL.
No. 252,774.              Patented Jan. 24, 1882.
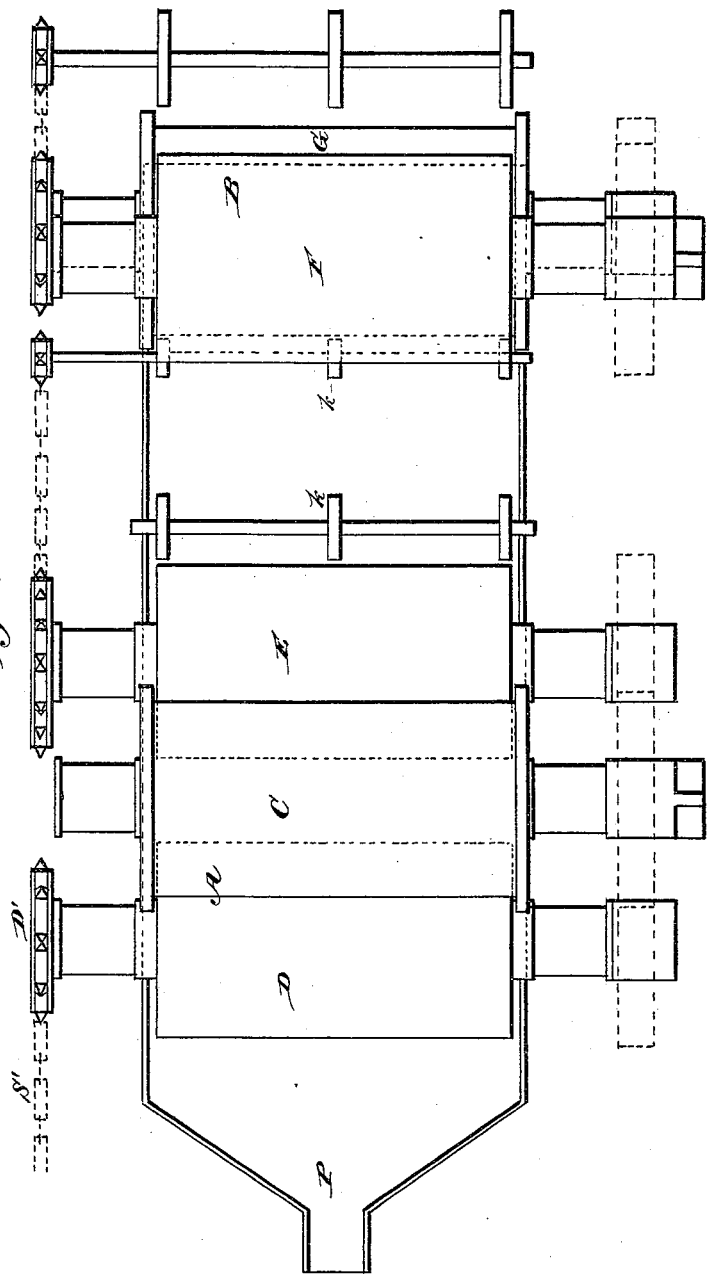
Witnesses.
Robt Everett
J. A. Rutherford
Inventor:
Charles G. Johnsen.
By James L. Norris.
Atty.

(No Model.)
C. G. JOHNSEN.
SUGAR MILL.
No. 252,774. Patented Jan. 24, 1882.
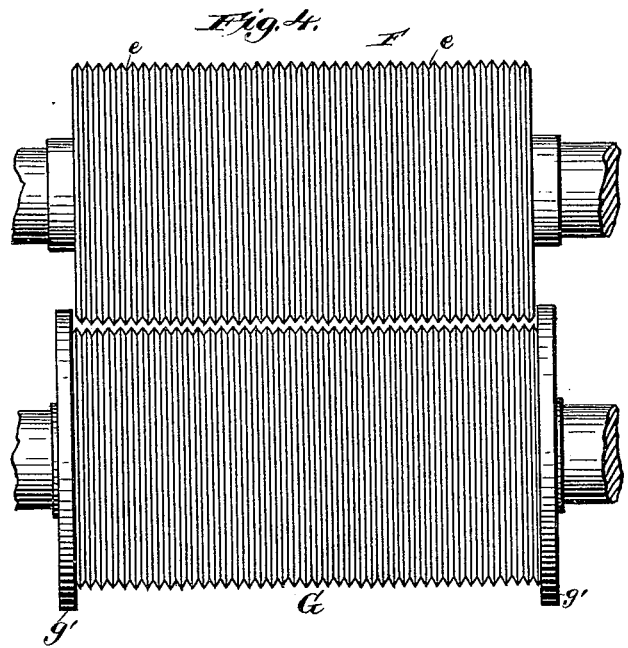
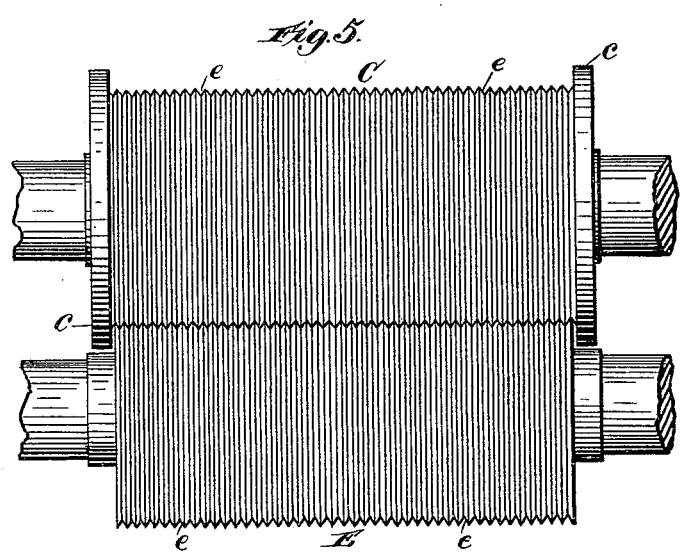
Witnesses.
Robert Everett.
J. A. Rutherford.
Inventor
Charles G. Johnsen.
By James L. Norris.
Atty.

(No Model.) 5 Sheets—Sheet 5.
C. G. JOHNSEN.
SUGAR MILL.
No. 252,774. Patented Jan. 24, 1882.
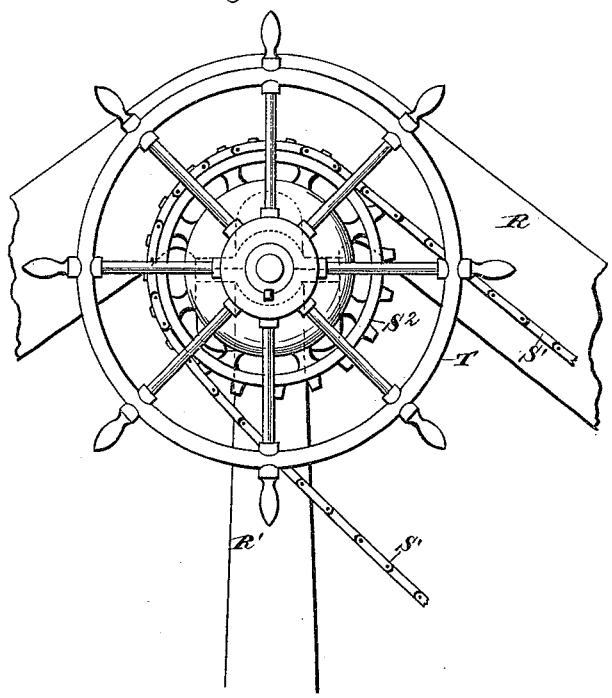
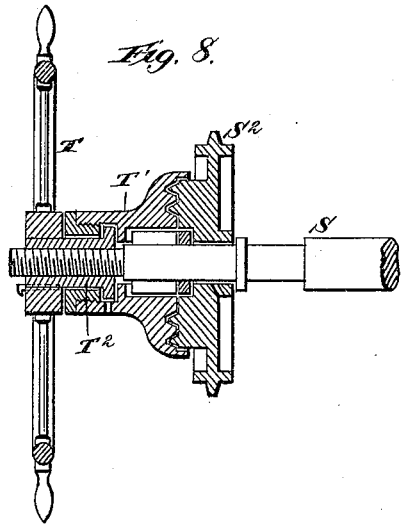
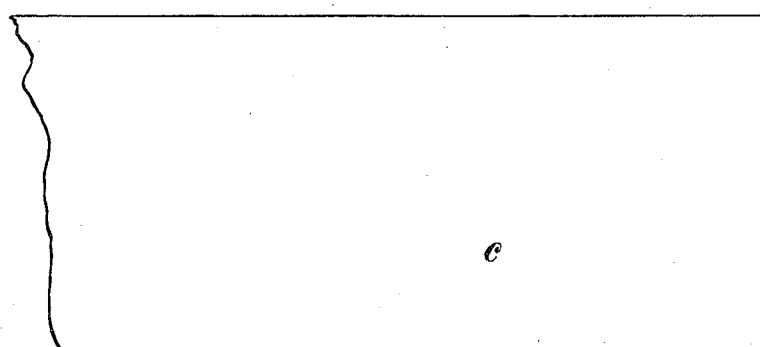
Witnesses.
Robt. Emmett.
J. A. Rutherford
Inventor:
Charles G. Johnsen.
By James L. Norris
Atty

UNITED STATES PATENT OFFICE.

CHARLES G. JOHNSEN, OF NEW ORLEANS, LOUISIANA.

SUGAR-MILL.

SPECIFICATION forming part of Letters Patent No. 252,774, dated January 24, 1882.

Application filed November 18, 1881. (No model.)

*To all whom it may concern:*

Be it known that I, CHARLES G. JOHNSEN, a citizen of the United States, residing at New Orleans, in the parish of Orleans and State of Louisiana, have invented new and useful Improvements in Sugar-Mills, of which the following is a specification.

My invention relates to certain improvements in sugar-mills; and the object of the invention is to render them more perfect and effective in operation, and to more completely express the juice from the cane. This object I attain by the construction and arrangement of mechanism illustrated in the accompanying drawings, in which—

Figure 1 is a side elevation of a sugar-mill embodying my invention. Fig. 2 is a vertical sectional view; Fig. 3, a plan or top view; Fig. 4, a view of the upper and lower rolls of the second set, showing the grooves in the rolls and the overlapping flanges on the lower roll; Fig. 5, a similar view of the upper and one of the lower rolls of the first set; Fig. 6, a view showing a part of one end of the upper roll in the first set, the same being on an enlarged scale to illustrate the relative size of the grooves and the end flanges. Fig. 7 is a front elevation of the friction-clutch, and Fig. 8 is a central sectional view of the same.

My improved mill is supported upon a suitable foundation and bed-plates, and has two sets of rolls, the first set, A, having three rolls, and the second set, B, two. The rolls of the first set are journaled in the housings X and Y, arranged independently of each other, and secured by vertical bolts $x$ and horizontal bolts $y$, so as to allow any of the rolls of said either set to be taken out without disturbing the others. It is not necessary to enter into details, as the construction will be obvious.

The upper roll, C, and the two lower rolls, D and E, of the first set are provided with gear-wheels, as shown. The rolls F and G of the second set are similarly geared, and both sets may be driven in any suitable well-known way. The rolls are provided with annular V-shaped grooves $e$, as shown in Figs. 4, 5, and 6, and the V-shaped ribs or projections on one roller are opposite the V-shaped grooves or depressions in the other, as shown. In the first set of rolls the upper roll is somewhat longer than the lower ones, and has a flange, $c$, at each end, which overlaps the lower rolls, and thus prevents the escape sidewise of the crushed cane or bagasse. The second set of rolls is similarly constructed, except that I prefer to have the overlapping flanges $g'$ on the lower roll.

The rolls may be made of any suitable length and diameter; but I prefer for some purposes to make them of the following dimensions: Referring to the first set, the bottom rolls in practice are five feet long and thirty-four inches in diameter. The top roll is of the same diameter, but is five inches longer, including the overlapping flange at each end. In the second set the rolls are in practice each thirty-six inches in diameter, the upper roll five feet in length, and the lower one five feet five inches in length, including the overlapping flanges. The diameter of the rolls in the second set is greater than the diameter of the rolls in the first set, in order to increase the speed of the passage of the bagasse through them when they are driven at the same speed as those of the first set. The bagasse is thus taken freely and rapidly as it is delivered from the front set of rolls, and the clogging and choking of the mill is prevented.

The second set of rolls, F and G, it will be observed, is inclined backwardly or rearwardly from a perpendicular with relation to the first set of rolls—that is to say, the horizontal axes of these two rolls are located in different vertical planes, the plane in which the axis of the upper roll is located being the nearest to the first set of rolls. To such end the housings of the journals of the rolls G F are detachably secured in place by means of the inclined tie-rods $x'$, which are fastened at their lower ends in the base or foundation of the machine, and are inclined upwardly toward the first set of rolls. This arrangement facilitates the entrance of the bagasse between the rolls and allows the juice to flow freely into the pan from the rear side of the rolls. There is no tendency for the juice to pass through the rolls thus arranged, and the bagasse is delivered from them more free from juice than would be possible where the rolls are both arranged in the same perpendicular plane, or where the inclined plane, in which the axes of the rolls are located, has an upward inclination away from the first set of rolls, since in the latter instance the upper roll would be too much on that side of the set at which the bagasse passes from between the rolls.

Just below the upper roll, C, in the first set, and between the rolls D and E, is a curved plate, H, which is secured upon the cross-bar I. This plate rests in contact with or close to the faces of the rolls D and E, and fits snugly against the overlapping flanges $c$ on the roller C. After the cane has been pressed between the rolls C and D this plate receives it and guides or turns it between the rolls C and E, as will be clear from the drawing, and a plate, J, resting upon the roll E, serves to scrape the latter and direct the bagasse to the endless carrier K, traveling around pulleys or sprockets $k\ k$, driven in any suitable manner.

The plate J is carried by a rock-shaft, J', pivoted in the frame, and it is caused to bear upon the face of the roll E by the weighted lever-arm $J^2$, secured to the rock-shaft. The bagasse is delivered by the carrier K to the rolls F and G over a guide-plate, L. These rolls take the bagasse at an increased speed, and it is discharged from them over a guide-plate, M, on a rock-shaft, M', having a weighted lever arm, $M^2$, (shown in dotted lines,) from whence the bagasse is conveyed away by an endless carrier driven in any suitable way. This weighted lever-arm is arranged so as to cause the edge of the plate to rest upon the lower roll, and hence be maintained in position to receive the bagasse. A clearer or scraper, O, carried by a rock-shaft, O', pivoted in the frame and having a weighted lever-arm, $O^2$, bears upon the roll and clears it of adhering matter. A suitable pan, P, having an inclined bottom, is placed below each set of rolls to receive the juice which runs from the cane.

The cane is fed to the mill by an ordinary endless feed-carrier, (not shown in the drawings,) which delivers the cane at the top of the inclined chute R. The roller or shaft S of the endless feed-carrier is mounted in standards R', which also support the inclined chute. This roller S is driven from the roll D by a chain, S', which passes over a sprocket, D', fast on the roll D, and over a sprocket, $S^2$, loose on the roller. The roller S and its endless carrier are thrown into or out of action to regulate the feed by a friction-chuck operated by the hand-wheel T. This friction-clutch is composed of a corrugated or rimmed face on the outer face of the sprocket $S^2$ and a similar face on a hub, T', the hand-wheel T and hub being connected together by a threaded and collared sleeve, $T^2$, the latter being keyed to the hand-wheel and screwed on the threaded end of the shaft S. When the hand-wheel is turned in one direction the corrugated or rimmed faces of the sprocket S and hub T are clamped together, and the motion of the former is transmitted to the latter, which serves to rotate the roller or shaft S. A reverse movement of the hand-wheel releases the clutch and the sprocket revolves loosely on the said roller or shaft. In operation the cane descends through the inclined chute, passes between the rolls C and D, is turned by the plate H, and passes between the rolls C and E. The bagasse then passes over the plate J and is delivered to the rolls F and G, which take it rapidly and completely squeeze out the remaining juice.

The rolls of my improved mill are all formed with V-shaped grooves, each of which is a complete circle, and the bagasse passes straight through the mill, receiving a regular pressure, whereby the yield of juice is increased and power economized. Mills thus constructed run with less friction than the ordinary spirally-grooved machines, which tend to force the bagasse toward one end of the rolls, and the bagasse is not chopped as it is in such machines.

The mills organized as above described operate continuously, with rapidity, and do good work, and are not liable to become choked or clogged.

Having thus described my invention, what I claim is—

1. The combination, in a cane mill, of the herein-described two separate sets of rolls, the rolls of the second set having their axes arranged on an inclined plane which inclines backwardly or rearwardly toward the rolls of the first set of rolls, substantially as described.

2. The combination, in a cane-mill, of the herein-described first set of rolls with a second separate set of rolls of greater diameter than the rolls of the first set, substantially as shown and described, said sets of rolls being driven at the same rate of speed, whereby the speed at which the bagasse is drawn between the larger rolls of the second set will be greater than that at which the bagasse has been drawn between rolls of the first set, as and for the purpose set forth.

3. The combination, in a cane-mill, of the first set of grooved rolls with the second set of grooved rolls of larger diameter, the axes of which are arranged in an inclined plane which inclines backwardly and rearwardly toward the first set of rolls, substantially as described.

4. The combination, in a cane-mill, of the rolls C D E with the guide I, the scraper-plate J, rock-shaft J', and the weighted arm connected with said rock-shaft, substantially as described.

In testimony whereof I have hereunto set my hand in the presence of two subscribing witnesses.

CHARLES G. JOHNSEN.

Witnesses:
JNO. S. MOORE,
J. H. CHURCHILL.